June 29, 1954  M. R. BRUBAKER  2,682,430

VARIABLE TREAD WHEEL

Filed May 11, 1953

Patented June 29, 1954

2,682,430

UNITED STATES PATENT OFFICE 2,682,430

VARIABLE TREAD WHEEL

Marlin R. Brubaker, Little Britain Township, Lancaster County, Pa.

Application May 11, 1953, Serial No. 354,346

6 Claims. (Cl. 301—1)

This invention relates to a variable tread wheel and more particularly to a wheel for machinery such as agricultural equipment where it is necessary to change the distance between the wheels to adapt the machine to operate on various crops having different spacing between the rows.

In the building of agricultural equipment such as tractors, difficulty has been experienced in devising a system for altering the tread of the drive wheels. This problem is not encountered in the front wheel system but is encountered with the rear wheels because of the driving arrangement. In using a machine of this type to cultivate row crops it is necessary to have the wheels positioned so that they will travel between the rows. Due to the fact that not all agricultural crops are planted on the same row centers, it is impossible to build a tractor which is suited for all possible row spacings. In order to produce a tractor in which the distance between the rear wheels can be varied, several systems have been used. One of the most common has been one in which the wheel can be turned on the hub and the tire can be turned on the wheel. This system makes it possible to change the distance between the wheels but this system is limited to certain fixed limitations and there are instances in which none of the limited possibilities are suitable. In this system it is necessary to jack up the tractor in order to shift the position of the wheels.

Another system which has been used is the one disclosed in Patent No. 2,417,139 in which a plurality of helical cam tracks on the rim of the tire engage cams mounted on the wheel in such manner that relative movement between the tire rim and the wheel cause the tire to be moved toward or away from the opposite wheel. In this system, the amount of movement is limited to the width of the rim.

Another system used currently is the spline system in which the driving axle is a spline shaft and the wheel is moved on the axle to the desired point. In this system it is necessary to jack up the machine and a great deal of work is involved to make the proper adjustment.

In order to overcome the disadvantages of the prior art systems enumerated above, I have developed a system which makes possible a much greater latitude of adjustment which does not take up an unusual amount of space when the wheels are not extended to their maximum extent. This system comprises a cylinder or drum which is mounted on the wheel of the tractor and the tire rim is mounted on the drum. The arrangement is such that relative lateral movement between the tire and the drum is possible, and relative lateral movement between the wheel and the drum is possible. This arrangement makes possible a great deal of variation in the width of the tread since the lateral distance each tire can move is slightly less than twice the width of the drum.

An object of this invention is to provide a system for varying the tread of the drive wheels of machinery by applying power to the wheels to accomplish relative rotation between the drive wheel and an intermediate drum and relative rotation between the intermediate drum and the tire.

Another object of this invention is to provide a system for varying the tread spacing on the drive wheels of agricultural machinery by providing a maximum latitude of movement which is greater than the width of any one of the component parts.

Still another object of this invention is to provide a system in which any desired spacing can be attained between the fixed maximum and minimum distances.

In order that this invention may be more readily understood, it will be described in connection with the attached drawing, in which Figure 1 is an elevational view of the portion of the tractor wheel which is mounted on the driving axle of the tractor;

Figure 1:
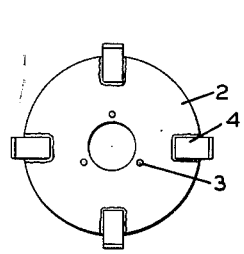
Figure 2:
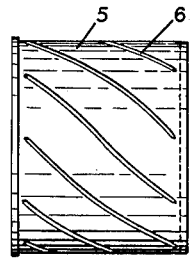
Figure 2 shows the intermediate portion of the wheel.
Figure 3:
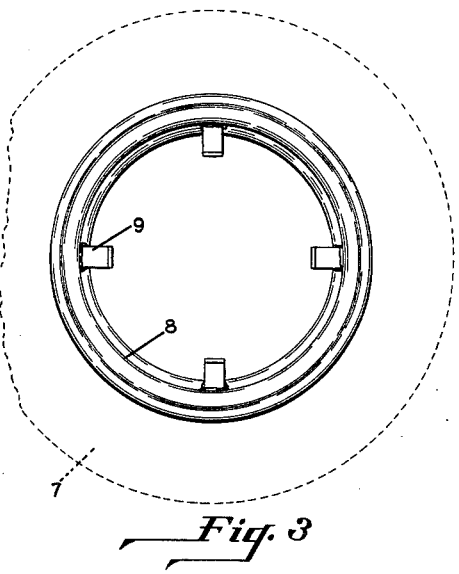
Figure 3 shows the tire and rim assembly.

Referring to Figures 1, 2 and 3 of the drawing there are shown the three component parts which make up the invention. Figure 1 shows a tractor wheel 2 which is fastened to a driving member on the end of a conventional tractor axle by means of studs 3. Spaced equidistantly around the periphery of the wheel 2 are a plurality of lugs 4. These lugs 4 are merely right angle steel members, one arm of which is welded or otherwise securely fastened to the wheel 2. The other arm of the lugs 4, that is the arm disposed at a right angle with respect to the surface of the wheel 2 is provided with a hole to accommodate a bolt.

The second or intermediate part of the assembly is illustrated in Figure 2. This drum designated by the numeral 5, is made of relatively heavy gauge metal. The drum has a plurality of grooves or tracks 6 cut through the metal. These grooves 6 start from a point adjacent one edge of the drum, and extend in a helical direction toward the other edge of the drum. The drum 5 is of a size so that its inner diameter is slightly greater than the maximum diameter of wheel shown in Figure 1. Maximum diameter refers to the distance across the wheel from the outer edge of one lug 4 to the outer edge of the lug disposed diametrically opposite.

The third element of the assembly shown in

Figure 3 is the tire and rim. The pneumatic tire 7 and the rim 8 are conventional except that the rim 8 has a plurality of lugs 9 welded thereto. These lugs 9 are of the same general design as the lugs 4. The one leg of the lugs is welded or otherwise securely attached to the rim 8 while the other leg extending at right angles thereto is provided with a hole to receive a bolt. In lieu of the lugs 9 there may be provided a continuous ring surrounding the rim, said ring having a flange concentric with the drum. This concentric flange is drilled with properly spaced holes to accommodate bolts which will pass through the grooves 6.

Figure 4:
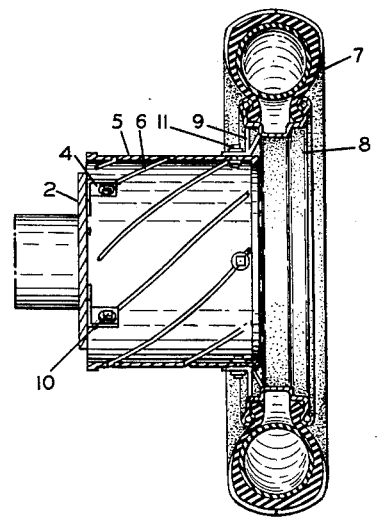
Figure 4 shows the assembly in place on the tractor with the tire in its fully extended position.
Figure 5:
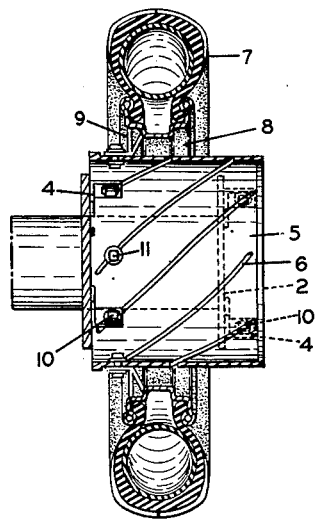
Figure 5 shows the assembly with the tire in its innermost position on the drum.

Referring now to Figures 4 and 5 the elements referred to above are shown in their relative positions with the tire fully extended and with the tire withdrawn. In Figure 4 the lugs 4 of the wheel 2 are shown with the bolts 10 at the inner extremity of the grooves 6 in the drum 5. On the other edge of the drum 5, the lugs 9 which are welded on to the rim 8 are secured to the drum 5 by the bolts 11. These bolts 11 are in the outer extremity of the helical grooves 6.

It will be noted that the number of lugs 4 secured to the wheel 2 corresponds to the number of lugs 9 secured to the rim 8 and that the number of grooves 6 in the drum 5 is equal to the total of the lugs on the wheel and the lugs on the tire. This is necessary so that the bolts from the lugs on the wheel can be placed in alternate grooves and the bolts from the lugs on the tire can be placed in the intermediate grooves. In the embodiment here illustrated the wheel has four lugs, the tire has four lugs and the drum has eight grooves. It will be understood of course that the invention can be carried out using a greater or lesser number of lugs. For example, the tire could have three lugs, the wheel three lugs and the drum six grooves, or the wheel and tire could have five lugs each and the drum could have ten grooves.

Referring to Figure 5, the tire 7 is shown in its innermost position on the drum 5 with the bolts 11 at the inner ends of the helical grooves 6. The wheel 2 is shown in solid lines in Figure 5 with the drum 5 in its fully extended position. This shows the relative position of the component parts when the drum is in its fully extended position on the wheel and the tire is in its fully receded position on the drum.

The wheel 2 is also shown in Figure 5 in dotted lines which shows the relative position of the component parts when the drum 5 is fully receded on the wheel and the tire is fully receded on the drum.

From an observation of the relative position of the component parts shown in Figures 4 and 5, it will be seen that the widest part in the assembly is the drum 5, but the total lateral distance which the tire 7 can move with respect to the wheel 2 is substantially greater than the width of the drum, as a matter of fact, the distance that the tire can move is almost twice the width of the drum. In making this observation it must be borne in wind that the wheel 2 is always on the same vertical plane with respect to the machine on which it is mounted, and the drum 5 moves laterally on the wheel and the tire rim moves laterally on the drum. It will be readily perceived that with both tires being capable of such a wide latitude of movement the tread can be varied to accommodate a vast number of row spacings.

In making adjustments in which the tire is not at its outermost extremity or its innermost extremity it will be necessary to move the lugs 9 attached to the tire rim 8 and the lugs 4 attached to the wheel 2 only a portion of the distance which the grooves 6 will permit them to move. In order to accomplish this, stops may be provided which will obstruct the passage of the lug bolts 10 and 11 through the grooves 6 of the drum 5. These stops are usually held in place by a clamping bolt which may be readily loosened to permit ready movement of the stops.

If desired the drum 5 may be provided with suitable graduations to designate the resultant distance between tires for a given setting of the lugs in the helical grooves. It will be understood that for this system of graduated markings, each graduation will represent several possible settings. For example if the wheel lugs are in one position, each graduation will stand for a certain tread distance. If the wheel lugs are in a different position, each graduation mark on the drum will stand for a different tread distance, etc.

The amount of power which can be used in shifting the relative position of the component parts is determined by the helix angle of the grooves 6 in the drum 5. In a heavy piece of machinery the helix angle is preferably low so that the grooves 6 are long and each groove covers a substantial portion of the circumference of the drum 5. In this arrangement a maximum amount of torque can be utilized in shifting the component parts from one position to another. In lighter weight machinery a lesser amount of torque is required and the helix angle can be greater so that the grooves 6 will not extend around as great a portion of the drum in their helical progression from one side of the drum to the other.

In the operation of this device, when it is desired to change the relative setting of the component parts of the wheel assembly to change the tread setting across the drive wheels of the machine, the bolts 10 passing through the wheel lugs 4 and the grooves 6 in the drum 5 are loosened so that the bolts 10 are free to move in the grooves 6 as the wheel 2 is rotated. The bolts 11 passing through the tire lugs 9 and the grooves 6 in the drum 5 are also loosened so that these bolts 11 are free to move in the grooves 6 as the drum 5 is rotated. When power is applied to the wheel 2 the rotatory force of the bolts 10 carried by the lugs 4 on the wheel 2 as they move along the grooves 6 in the drum 5, move the drum 5 outward or inward on the wheel 2 depending on the direction of rotation of the wheel 2. When the bolts 10 reach the ends of the grooves 6 there is no longer any possibility of movement of the wheel 2 with respect to the drum 5; the drum 5 is then rotated with the wheel 2.

The rotary movement of the drum 5 moves the bolts 11 in the grooves 6 of drum 5 which moves the tire 7 inward or outward with respect to the drum 5 depending on the direction of rotation of the drum 5. This inward or outward movement of the tire 7 with respect to the drum 5 continues until the bolts 11 reach the ends of the grooves 6 at which time the tire 7 rotates with the drum 5. When the desired shifting movement has been effected the bolts 10 and 11 are tightened so that the newly assumed relationship of the component parts can be maintained through constant usage.

In the event it is not necessary to move the component parts to the fullest extent possible limited movement can be accurately controlled by placing the stops in the grooves 6 to engage the lug bolts 10 and 11 at the desired points so that the amount of movement can be accurately controlled. It has been found in actual practice that reasonably accurate control can be exercised by merely exerting sufficient torque to the drive wheel 2 to change the relative position of the parts to the extent desired. After a relatively few practice trials an operator of average skill can perform this operation with a minimum of time and effort.

In changing the tread it has been found desirable to change one wheel at a time keeping the other drive wheel locked until the bolts on the first wheel have been tightened.

It will be observed from the foregoing that I have developed a system in which the component parts of a tractor wheel and tire assembly can be changed in their relative positions without necessitating the arduous time consuming operation of jacking up the machine and actually physically moving the heavy wheel on the axle or turning the wheel on the hub. In the system of this invention a large amount of lateral movement is possible by loosening the lug bolts on the wheel and tire and applying torque through the existing drive mechanism to change the relative position of the component parts.

I claim:

1. In an adjustable driving unit for a tractor and the like, the elements comprising, a wheel attached to the driving axle, a cylindrical drum surrounding said wheel, a plurality of lugs attached to said wheel and connected to said drum by means of bolts passing through the lugs and through helical grooves in said drum, a rim surrounding said drum, said rim being provided with lugs which are securely attached thereto and which are connected to the drum by means of bolts passing through said lugs and through helical grooves in said drum.

2. In an adjustable driving unit for a tractor or the like, the elements comprising a wheel attached to the driving axle, a plurality of lugs securely attached to said wheel, a cylindrical drum surrounding said wheel, said drum being provided with a plurality of helical grooves, each groove extending from one edge of the drum to the other edge of the drum over a portion of the circumference of the drum, means passing through said lugs and certain of said grooves to connect said drum to said wheel, a rim surrounding said drum, a plurality of lugs securely attached to said rim, and means passing through said lugs and certain of said grooves to connect said rim to said drum, means for clamping said wheel lugs to said drum at any given point in the helical grooves and means for clamping said rim lugs to said drum at any given point in the helical grooves.

3. In an adjustable driving unit for a tractor or the like, the elements comprising a wheel attached to the driving axle, a cylindrical drum surrounding said wheel, said drum being provided with a plurality of helical grooves, each groove extending from one edge of the drum to the other edge of the drum over a portion of the circumference of the drum, a plurality of means attached to said wheel and passing through certain of said helical grooves to connect said drum to said wheel, a rim surrounding said drum, a plurality of means attached to said rim and passing through certain of said helical grooves to connect said rim to said drum, means for clamping said wheel to said drum at any given point along the horizontal axis of said drum between the two extremities of the helical grooves, and means for clamping the rim to said drum at any given point along the horizontal axis of said drum between the two extremities of the helical grooves.

4. In an adjustable driving unit for a tractor or the like, the elements comprising a wheel attached to the driving axle, a cylindrical drum surrounding said wheel, said drum being provided with a plurality of helical grooves, each groove extending from one edge of the drum to the other edge of the drum over a portion of the circumference of the drum, a plurality of means attached to said wheel and passing through certain of said helical grooves to connect said drum to said wheel, the arrangement being such that rotary motion of the wheel will move said drum in a direction parallel to its horizontal axis, a rim surrounding said drum, a plurality of means attached to said rim and passing through certain of said helical grooves to connect said rim to said drum, the arrangement being such that rotary motion of the drum will move said rim in a direction parallel to the horizontal axis of the drum, means for clamping said wheel to said drum at any given point along the horizontal axis of said drum between the two extremities of the helical grooves, and means for clamping the rim to said drum at any given point along the horizontal axis of said drum between the two extremities of the helical grooves.

5. In an adjustable driving unit for a tractor or the like, the elements comprising a wheel attached to the driving axle, a cylindrical drum surrounding said wheel, said drum being provided with a plurality of helical grooves, each groove extending from one edge of the drum to the other edge of the drum over a portion of the circumference of the drum, a plurality of means attached to said wheel and passing through certain of said helical grooves to connect said drum to said wheel, a rim surrounding said drum, a plurality of means attached to said rim and passing through certain of said helical grooves to connect said rim to said drum, the means attached to said rim passing through alternate helical grooves and being equal in number to the means attached to said wheel which pass through the intermediate grooves, means for clamping said wheel to said drum at any given point along the horizontal axis of said drum between the two extremities of the helical grooves, and means for clamping the rim to said drum at any given point along the horizontal axis of said drum between the two extremities of the helical grooves.

6. An adjustable driving unit for a tractor or the like, the elements comprising a wheel attached to the driving axle, a cylindrical drum surrounding said wheel, a plurality of means attached to said wheel and adjustably attached to said drum whereby rotation of said wheel will move said drum in a direction parallel to its horizontal axis, a rim surrounding said drum, a plurality of means attached to said rim and adjustably attached to said drum whereby rotation of said drum will move said rim in a direction parallel to the horizontal axis of said drum, and means for clamping the wheel and rim at any point along the horizontal axis of said drum.

References Cited in the file of this patent

UNITED STATES PATENTS

| Number | Name | Date |
| --- | --- | --- |
| 1,802,773 | Nelson | Apr. 28, 1931 |
| 2,162,696 | Burger | June 20, 1939 |
| 2,417,139 | Strehlow | Mar. 11, 1947 |